US011889863B2

(12) United States Patent
Qiu et al.

(10) Patent No.: US 11,889,863 B2
(45) Date of Patent: Feb. 6, 2024

(54) VOLTAGE OUTPUT CIRCUIT AND ELECTRONIC CIGARETTE

(71) Applicant: CHANGZHOU PATENT ELECTRONIC TECHNOLOGY CO., LTD, Changzhou (CN)

(72) Inventors: Weihua Qiu, Jiangsu (CN); Kui Liu, Jiangsu (CN)

(73) Assignee: CHANGZHOU PATENT ELECTRONIC TECHNOLOGY CO., LTD, Changzhou (CN)

( * ) Notice: Subject to any disclaimer, the term of this patent is extended or adjusted under 35 U.S.C. 154(b) by 511 days.

(21) Appl. No.: 17/206,194

(22) Filed: Mar. 19, 2021

(65) Prior Publication Data

US 2021/0204598 A1 Jul. 8, 2021

Related U.S. Application Data

(63) Continuation-in-part of application No. PCT/CN2019/106067, filed on Sep. 17, 2019.

(30) Foreign Application Priority Data

Sep. 19, 2018 (CN) .......................... 201811094747.2

(51) Int. Cl.
 *A24F 40/40* (2020.01)
 *H02M 3/158* (2006.01)
(52) U.S. Cl.
 CPC ........... *A24F 40/40* (2020.01); *H02M 3/1582* (2013.01)
(58) Field of Classification Search
 CPC .............................. A24F 40/40; H02M 3/1582

USPC ........................................................ 131/329
See application file for complete search history.

(56) References Cited

U.S. PATENT DOCUMENTS

| 11,245,281 B2* | 2/2022 | Fernando | H02J 7/0071 |
| 2011/0006684 A1* | 1/2011 | Hodgson | H05B 45/395 |
| | | | 362/549 |
| 2018/0205242 A1* | 7/2018 | Kelly-Morgan | B64C 39/024 |

(Continued)

FOREIGN PATENT DOCUMENTS

| CN | 203491727 U | 3/2014 |
| CN | 205330304 U | 6/2016 |
| CN | 205390304 U | 7/2016 |

(Continued)

OTHER PUBLICATIONS

The extended European Search Report of EP Application No. 19862872.9 dated May 6, 2022.

*Primary Examiner* — Gary F Paumen
(74) *Attorney, Agent, or Firm* — Andrew C. Cheng

(57) ABSTRACT

The disclosure provides a voltage output circuit. The voltage output circuit includes a control chip and a buck switch chip. The control chip includes a first control signal input terminal, a second control signal input terminal, and a modulation signal output terminal. The buck switch chip includes a first channel terminal, a first control terminal, and a second channel terminal. The first channel terminal receives a system power supply voltage. The first control terminal is connected to the modulation signal output terminal of the control chip. When the first control signal input terminal and/or the second control signal input terminal receives an effective level, the control chip controls the second channel terminal to output a driving voltage.

12 Claims, 5 Drawing Sheets

(56) References Cited

U.S. PATENT DOCUMENTS

2019/0341797 A1* 11/2019 Floresca ................. H02J 50/10
2021/0056281 A1* 2/2021 Shih .................. G06F 3/041661

FOREIGN PATENT DOCUMENTS

| CN | 105876869 A | 8/2016 |
| CN | 107568804 A | 1/2018 |
| CN | 108461017 A | 8/2018 |
| CN | 208837115 U | 5/2019 |
| ES | 1105731 U | 4/2014 |
| WO | 2018001910 A1 | 1/2018 |

* cited by examiner

VOLTAGE OUTPUT CIRCUIT AND ELECTRONIC CIGARETTE

CROSS-REFERENCE TO RELATED APPLICATIONS

The present application is a continuation-in-part of international application No. PCT/CN2019/106067, filed on Sep. 17, 2019, which claims priority to Chinese patent application No. 201811094747.2, filed on Sep. 19, 2018, and the entire disclosures of the foregoing applications are incorporated herein by reference.

FIELD OF TECHNOLOGY

The present invention relates to the technical field of electronic equipment, and more particularly, relates to a voltage output circuit and an electronic cigarette.

BACKGROUND

As a substitute for cigarettes, electronic cigarettes are becoming more and more popular in the market due to their safety, convenience, health, and environmental protection to a certain extent.

At present, e-cigarettes usually only provide a single sensor or button for users to light up the cigarette, and the way of lighting the e-cigarette is single.

SUMMARY

In order to solve the problem of the single lighting method of electronic cigarettes in the prior art, the present disclosure provides a voltage output circuit and an electronic cigarette. The technical solution is as follows:

In a first aspect, a voltage output circuit is provided, and the voltage output circuit includes:
- a control chip U6, the control chip U6 includes a first control signal input terminal 20, a second control signal input terminal 21, and a modulation signal output terminal 23, the first control signal input terminal 20 is connected to a first control signal output terminal 24 of a suction detection element J3, the second control signal input terminal 21 is connected to a second control signal output terminal 37 of a touch sensing chip U8, a touch input pin 25 of the touch sensing chip U8 is connected to a touch panel;
- a buck switch chip U2, the buck switch chip U2 includes a first channel terminal 26, a first control terminal 27, and a second channel terminal 28, the first channel terminal 26 of the buck switch chip U2 receives a system power supply voltage, the first control terminal 27 of the buck switch chip U2 is connected to the modulation signal output terminal 23 of the control chip U6;
- when the first control signal input terminal 20 receives an effective level and/or the second control signal input terminal 21 receives an effective level, the modulation signal output terminal 23 of the control chip U6 outputs a pulse width modulation signal to the first control terminal 27 of the buck switch chip U2;
- when the first control terminal 27 of the buck switch chip U2 receives a pulse width modulation signal of an effective level, the first channel terminal 26 and the second channel terminal 28 are controlled to be conducted, and the second channel terminal 28 outputs a driving voltage with a voltage value thereof being less than a voltage value of the system power supply voltage.

In one embodiment, a first enable signal output terminal 29 of the control chip U6 is electrically connected to a second control terminal 30 of a second switching element Q11, a third channel terminal 19 of the second switching element Q11 is grounded, a fourth channel terminal 18 of the second switching element Q11 is electrically connected to a negative electrode of a motor, and a positive electrode of the motor receives the system power supply voltage;
- when the second control signal input terminal 21 receives an effective level, the second switching element Q11 controls the third channel terminal 19 and the fourth channel terminal 18 to be conducted according to an enable signal provided by the first enable signal output terminal 29 of the control chip U6, so that the motor is energized to work.

In one embodiment, the first control signal input terminal 20 of the control chip U6 is electrically connected to the first control signal output terminal 24 of the suction detection element J3 through a first current limiting resistor R5; and/or,
- the second control signal input terminal 21 of the control chip U6 is connected to the second control signal output terminal 37 of the touch sensing chip U8 through a second current limiting resistor R11; and/or,
- the first channel terminal 26 of the buck switch chip U2 is connected to the modulation signal output terminal 23 of the control chip U6 through a third current limiting resistor R10; and/or,
- the first control signal output terminal 24 of the suction detection element J3 is grounded through a fourth current limiting resistor R8.

In one embodiment, a first power receiving terminal 32 of the control chip U6 is grounded through a first filter capacitor C2 and receives the system power supply voltage through a fifth current limiting resistor R14; and/or,
- the first channel terminal 26 of the buck switch chip U2 is further grounded through a second filter capacitor C3; and/or,
- the touch input pin 25 of the touch sensing chip U8 is further grounded through a third filter capacitor C6; and/or,
- a second power input terminal 33 of the touch sensing chip U8 receives the system power supply voltage and is grounded through a fourth filter capacitor C7.

In one embodiment, the second channel terminal 28 of the buck switch chip U2 is connected to a heating wire to output the driving voltage VOUT to drive the heating wire to generate heat.

In one embodiment, the control chip U6 further includes a second enable signal output terminal 34, a first current receiving terminal 35, and a second current receiving terminal 36, the voltage output circuit further includes a resistance detection circuit 110, the second enable signal output terminal 34 of the control chip U6 is connected to the resistance detection circuit 110;
- the resistance detection circuit 110 includes a sixth current limiting resistor R23, a seventh current limiting resistor R22, a first detection resistor R18, a second detection resistor R21, a third detection resistor R20, a fifth filter capacitor C25, a sixth filter capacitor C24, and a third switching element Q5;
- a fifth channel terminal 38 of the third switching element Q5 receives the system power supply voltage and is connected to the second enable signal output terminal 34 of the control chip U6 through the sixth current limiting resistor R23; a third control terminal 40 of the third switching element Q5 is connected to the second enable signal output terminal 34 of the control chip U6 through the seventh current limiting resistor R22; a sixth channel terminal 39 of the third switching element Q5 is connected to the second channel terminal 28 of the buck switch chip U2 through the first detection resistor R18;

one end of the second detection resistor R21 is grounded through the fifth filter capacitor C25 and is connected to the first current receiving terminal 35 of the control chip U6, the other end of the second detection resistor R21 is connected to the second channel terminal 28 of the buck switch chip U2;

one end of the third detection resistor R20 is grounded through the sixth filter capacitor C24 and is connected to the second current receiving terminal 36 of the control chip U6, the other end of the third detection resistor R20 is connected to the sixth channel terminal 39 of the third switching element Q5.

In one embodiment, the control chip U6 further includes at least one indicator control terminal, and each indicator control terminal is connected to an indicating circuit 200;

the indicating circuit 200 includes at least one eighth current limiting resistor R17 and at least one light-emitting diode D4, the cathode of each light-emitting diode D4 is connected to an indicator control terminal of the control chip U6 through an eighth current limiting resistor R17, the anode of each light-emitting diode D4 receives the system power supply voltage.

In one embodiment, the second control signal input terminal is electrically connected to a button.

In one embodiment, the voltage output circuit further includes the touch sensing chip U8 and/or the suction detection element J3.

In a second aspect, an electronic cigarette is provided, and the electronic cigarette includes any one of the above voltage output circuits.

In one embodiment, the electronic cigarette further includes a rechargeable battery, the rechargeable battery is used to provide the system power supply voltage.

In one embodiment, the electronic cigarette further includes a charging circuit 300, the charging circuit 300 includes a connector J2 and a charging chip U4;

the charging chip U4 includes a second power receiving terminal 41 and a charging voltage output terminal 42, the second power receiving terminal 41 is connected to an external power source through the connector J2, the charging voltage output terminal 42 is used to output a charging voltage to the positive electrode of the rechargeable battery.

In one embodiment, the charging circuit 300 further includes a battery protection chip U1, the battery protection chip U1 includes a third power receiving terminal 51, a ground terminal 52, a heat sink terminal 53, and a charging detection terminal 54;

the third power receiving terminal 51 of the battery protection chip U1 is connected to the positive electrode of the rechargeable battery, the ground terminal 52 of the battery protection chip U1 is connected to the negative electrode of the rechargeable battery, the heat sink terminal 53 of the battery protection chip U1 is connected to the ground terminal 52 of the battery protection chip U1, the charging detection terminal 54 of the battery protection chip U1 is grounded.

The beneficial effects brought about by the technical solutions provided by the embodiments of the present disclosure are:

By providing a voltage output circuit, the voltage output circuit includes a control chip U6 and a buck switch chip U2. The control chip U6 includes a first control signal input terminal 20, a second control signal input terminal 21, and a modulation signal output terminal 23. The first control signal input terminal 20 is electrically connected to the first control signal output terminal 24 of the suction detection element J3. The second control signal input terminal 21 is connected to the second control signal output terminal 37 of the touch sensing chip U8. The touch input pin 25 of the touch sensing chip U8 is connected to the touch panel. The buck switch chip U2 includes a first channel terminal 26, a first control terminal 27, and a second channel terminal 28. The first channel terminal 26 of the buck switch chip U2 receives a system power supply voltage. The first control terminal 27 of the buck switch chip U2 is connected to the modulation signal output terminal 23 of the control chip U6. When the suction detection element J3 detects a suction signal and/or the touch sensing chip U8 receives a touch signal, the control chip U6 controls its modulation signal output terminal 23 to output a pulse width modulation signal to the buck switch chip U2, so that the buck switch chip U2 realizes voltage reduction according to the pulse width modulation signal and outputs a driving voltage VOUT with a voltage value thereof being less than the voltage value of the system power supply voltage VCC_BAT to the load such as the heating wire, so as to provide users with a variety of cigarette lighting methods. In this way, the problem of the single lighting method of electronic cigarettes in the related art is solved, and the effect of varying the lighting methods of electronic cigarettes is achieved.

BRIEF DESCRIPTION OF THE DRAWINGS

In order to explain the technical solutions in the embodiments of the present disclosure more clearly, the following will briefly introduce the drawings that need to be used in the description of the embodiments. Obviously, the drawings in the following description are only some implementations of the present utility model. For example, for those of ordinary skill in the art, without creative work, other drawings can be obtained based on these drawings.

DETAILED DESCRIPTION OF THE PREFERRED EMBODIMENTS

In order to facilitate understanding of the present invention, the present invention will be described more fully below with reference to the related drawings. The drawings show the preferred embodiments of the present invention. However, the present invention can be implemented in many different forms and is not limited to the embodiments described herein. Rather, these embodiments are provided to provide a thorough understanding of the disclosure of the present invention.

It should be noted that when an element is referred to as being "fixed to" another element, it may be directly on the other element or there may be a centered element. When an element is considered to be "connected" to another element, it can be directly connected to the other element or intervening elements may also be present.

Unless defined otherwise, all technical and scientific terms used herein have the same meaning as commonly understood by one of ordinary skill in the art to which this invention belongs. The terms used herein in the description of the present invention are only for the purpose of describing specific embodiments, and are not intended to limit the present invention. The term "and/or" as used herein includes any and all combinations of one or more of the associated listed items.

First Embodiment

Figure 1:
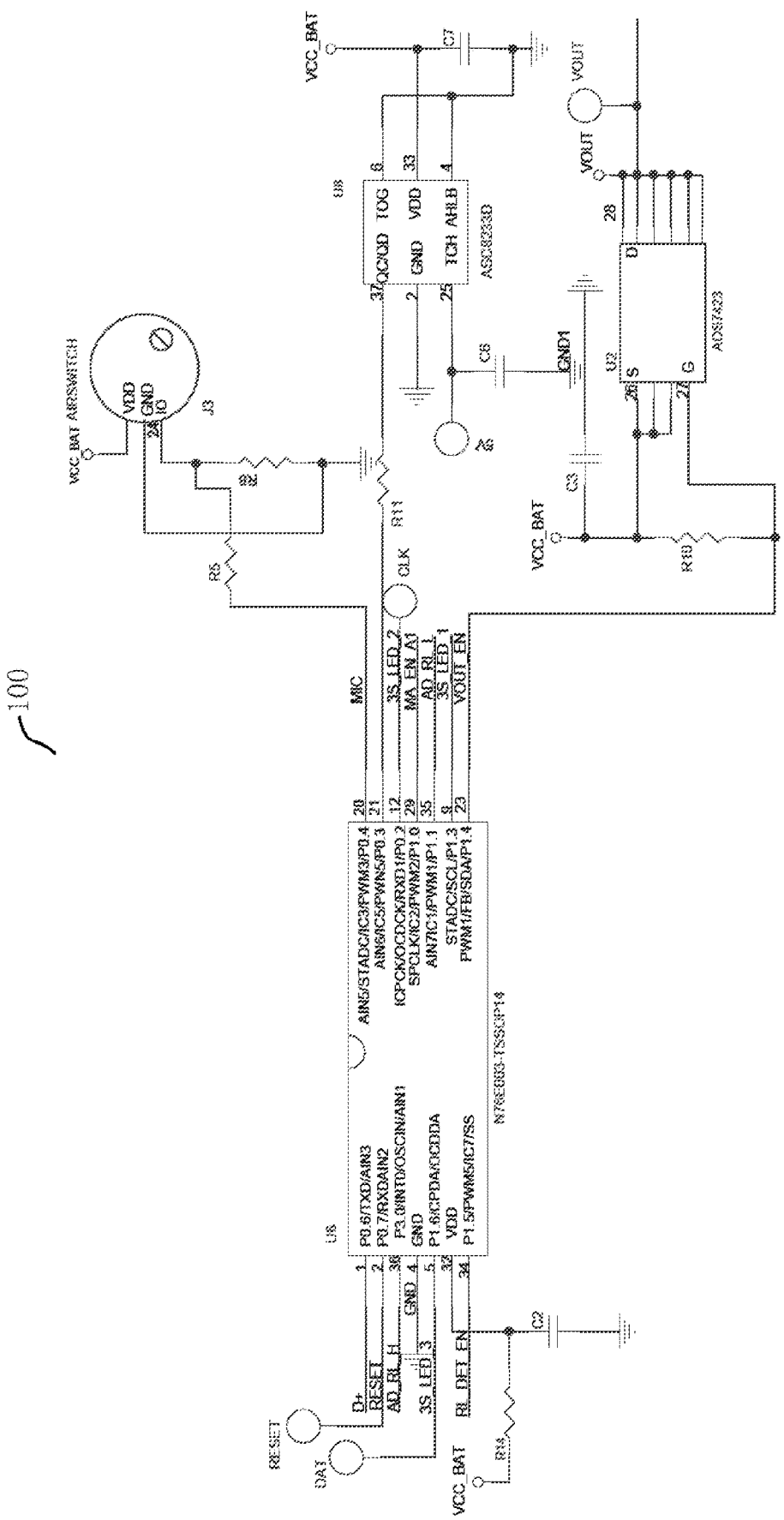
FIG. 1 is a schematic diagram of a voltage output circuit provided by the first embodiment of the present invention.

FIG. 1 is a schematic diagram of a voltage output circuit 100 provided by the first embodiment of the present invention. As shown in FIG. 1, the voltage output circuit 100 of this embodiment includes a control chip U6 and a buck switch chip U2.

Specifically, the control chip U6 includes a first control signal input terminal 20, a second control signal input terminal 21, and a modulation signal output terminal 23. The first control signal input terminal 20 of the control chip U6 is connected to the first control signal output terminal 24 of the suction detection element J3. The ground terminal GND of the suction detection element J3 is grounded, the power receiving terminal VDD of the suction detection element J3 receives the system power supply voltage VCC_BAT. Specifically, the suction detection element J3 may be a detection element such as an airflow sensor, an air pressure sensor, etc., which can be used to detect whether the user is sucking.

The second control signal input terminal 21 of the control chip U6 is connected to the second control signal output terminal 37 of the touch sensing chip U8, the touch input pin 25 of the touch sensing chip U8 is connected to a touch panel (not shown), the touch input pin 25 of the touch sensing chip U8 is also grounded through a third filter capacitor C6, the second power input terminal 33 of the touch sensing chip U8 receives the system power supply voltage VCC_BAT and is grounded through a fourth filter capacitor C7.

Specifically, the buck switch chip U2 includes a first channel terminal 26, a first control terminal 27, and a second channel terminal 28. The first channel terminal 26 of the buck switch chip U2 receives the system power supply voltage VCC_BAT, and the first control terminal 27 of the buck switch chip U2 is connected to the modulation signal output terminal 23 of the control chip U6.

In one embodiment, the control chip U6 may be, but is not limited to, an integrated chip with a model of N76E003-TSSOP14*ICP. When the control chip U6 is the N76E003-TSSOP14*ICP integrated chip, the first control signal input terminal 20 is the AIN5/STADC/IC3/PWM3/P0.4 pin, the modulation signal output terminal 23 is the PWM1/FB/SDA/P1.4 pin, and the second control signal input terminal 21 is the AIN6/IC5/PWN5/P0.3 pin.

In one embodiment, the buck switch chip U2 may be, but is not limited to, a PMOS (positive channel metal oxide semiconductor) transistor integrated chip with a model of AOS7423. When the buck switch chip U2 is a PMOS transistor with a model of AOS7423, the first channel terminal 26 of the buck switch chip U2 is the source, the second channel terminal 28 is the drain, and the first control terminal 27 is the gate. In other embodiments, the buck switch chip U2 may also be other models or other types of integrated chips, such as DTQ3205, which is not limited in this embodiment.

Specifically, when the suction detection element J3 detects a suction signal, an effective level (which can be a high level or a low level as set by the system developer) is output through the first control signal output terminal 24; when the touch input pin 25 of the touch sensing chip U8 detects a touch signal, an effective level (which can be a high level or a low level as set by the system developer) is output through the second control signal output terminal 37; so that the control chip U6 controls its modulation signal output terminal 23 to output a pulse width modulation signal to the first control terminal 27 of the buck switch chip U2 according to the received effective level. Therefore, when the first control terminal 27 of the buck switch chip U2 receives a pulse width modulation signal of an effective level (for example, the effective level of the PMOS transistor is a low level), it controls the conduction of the first channel terminal 26 and the second channel terminal 28, so that the second channel terminal 28 outputs the driving voltage VOUT whose voltage value is less than the voltage value of the system power supply voltage VCC_BAT.

Optionally, the reset signal input terminal of the control chip U6 is electrically connected to the reset button. When the control chip U6 is the N76E003-TSSOP14*ICP integrated chip, the reset signal input terminal of the control chip U6 may be the P0.7/RXDAIN2 pin.

In one embodiment, the first control signal input terminal 20 of the control chip U6 is electrically connected to the first control signal output terminal 24 of the suction detection element J3 through a first current limiting resistor R5. The power receiving terminal VDD of the suction detection element J3 receives the system power supply voltage VCC_BAT. The first control signal output terminal 24 of the suction detection element J3 is grounded through a fourth current limiting resistor R8.

In one embodiment, the second control signal input terminal 21 of the control chip U6 is connected to the second control signal output terminal 37 of the touch sensing chip U8 through a second current limiting resistor R11.

In one embodiment, the first channel terminal 26 of the buck switch chip U2 is connected to the modulation signal output terminal 23 of the control chip U6 through a third current limiting resistor R10. The first channel terminal 26 is also grounded through a second filter capacitor C3.

In one embodiment, the control chip U6 further includes a first power receiving terminal 32 and a ground terminal. The first power receiving terminal 32 of the control chip U6 is grounded through a first filter capacitor C2 and receives the system power supply voltage VCC_BAT through a fifth current limiting resistor R14. Optionally, the first power receiving terminal 32 and the ground terminal of the control chip U6 may be, but are not limited to, the VDD pin and the GND pin of the N76E003-TSSOP14*ICP integrated chip, respectively.

In one embodiment, the second channel terminal 28 of the buck switch chip U2 is connected to a heating wire (not shown) to output the driving voltage VOUT to drive the heating wire to generate heat, so as to realize the atomization function.

Optionally, the voltage output circuit provided by the present application includes the above-mentioned suction detection element J3 and/or the touch sensing chip U8.

The voltage output circuit 100 provided in this embodiment includes a suction detection element J3 and a touch sensing chip U8. When the suction detection element J3 detects a suction signal and/or the touch sensing chip U8 receives a touch signal, the control chip U6 controls its modulation signal output terminal 23 to output a pulse width modulation signal to the buck switch chip U2, so that the buck switch chip U2 realizes voltage reduction according to the pulse width modulation signal and outputs a driving voltage VOUT whose voltage value is less than the system power supply voltage VCC_BAT to the load such as the heating wire, so as to provide users with a variety of cigarette lighting methods. In this way, the problem of the single lighting method of electronic cigarettes in the related art is solved, and the effect of varying the lighting methods of electronic cigarettes is achieved.

In addition, in this embodiment, the first current limiting resistor R5, the second current limiting resistor R11, and the third current limiting resistor R10 can be used for current-limiting protection to prevent circuit damage and enhance the stability of the voltage output circuit 100.

Second Embodiment

Figure 2:
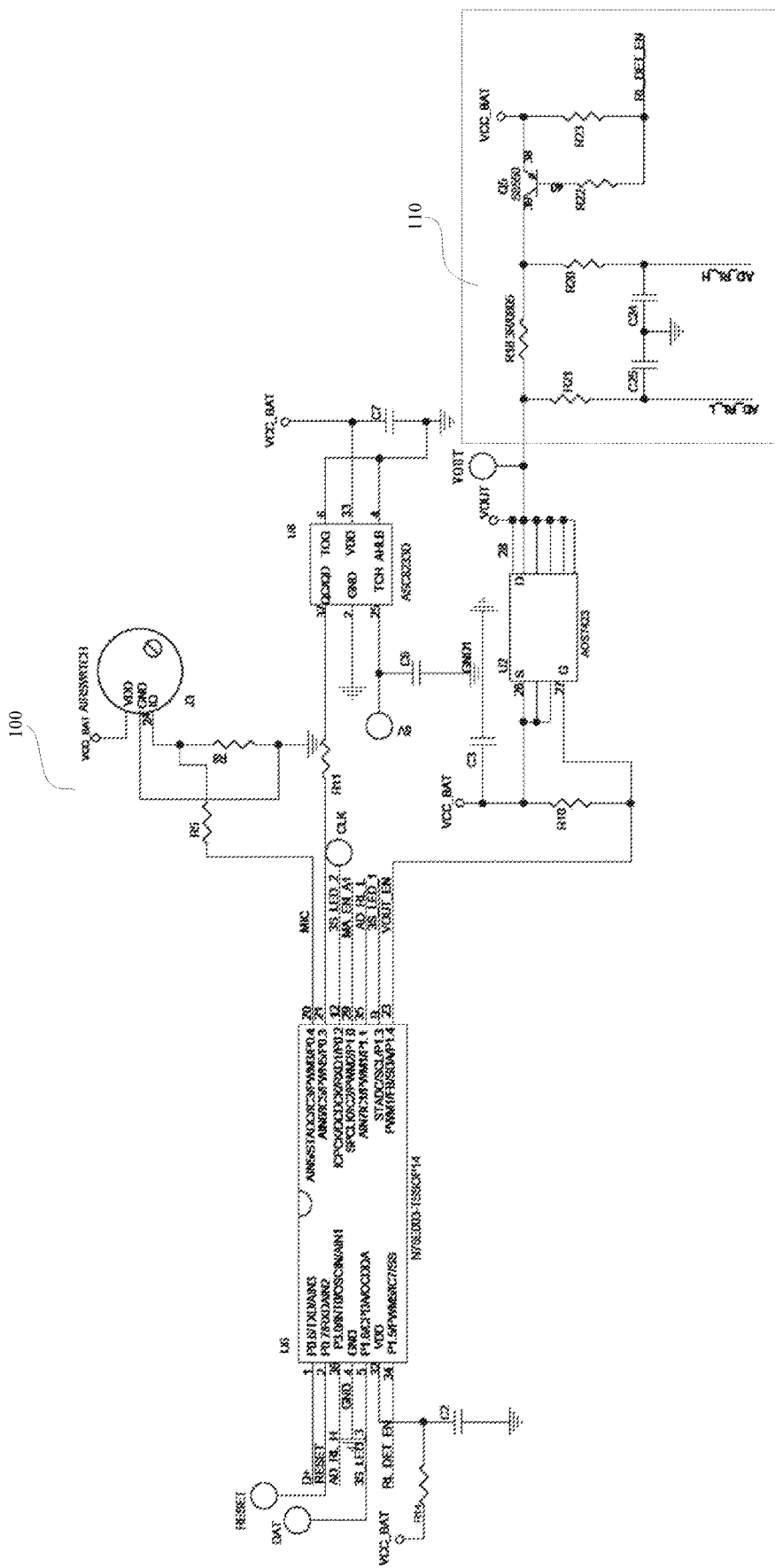
FIG. 2 is a schematic diagram of a voltage output circuit provided by the second embodiment of the present invention.

FIG. 2 is a schematic diagram of a voltage output circuit 100 provided by the second embodiment of the present invention. As shown in FIG. 2, the voltage output circuit 100 of this embodiment is basically the same as the first embodiment, and the difference lies in that the control chip U6 further includes a second enable signal output terminal 34, a first current receiving terminal 35, and a second current receiving terminal 36. The voltage output circuit 100 further includes a resistance detection circuit 110, and the second enable signal output terminal 34 of the control chip U6 is connected to the resistance detection circuit 110.

In one embodiment, the second enable signal output terminal 34, the first current receiving terminal 35 and the second current receiving terminal 36 may be, but are not limited to, the P1.5/PWM5/IC7/SS pin, the AIN7IC1/PWM1/P1.1 pin and P3.0/INT0/OSCIN/AIN1 pin of the N76E003-TSSOP14*ICP integrated chip.

The resistance detection circuit 110 includes a sixth current limiting resistor R23, a seventh current limiting resistor R22, a first detection resistor R18, a second detection resistor R21, a third detection resistor R20, a fifth filter capacitor C25, a sixth filter capacitor C24, and a third switching element Q5.

The fifth channel terminal 38 of the third switching element Q5 receives the system power supply voltage VCC_BAT, and is connected to the second enable signal output terminal 34 of the control chip U6 through the sixth current limiting resistor R23. The third control terminal 40 of the third switching element Q5 is connected to the second enable signal output terminal 34 of the control chip U6 through the seventh current limiting resistor R22. The sixth channel terminal 39 of the third switching element Q5 is connected to the second channel terminal 28 of the buck switch chip U2 through the first detection resistor R18.

One end of the second detection resistor R21 is grounded through the fifth filter capacitor C25, and is connected to the first current receiving terminal 35 of the control chip U6, and the other end of the second detection resistor R21 is connected to the second channel terminal 28 of the buck switch chip U2. One end of the third detection resistor R20 is grounded through the sixth filter capacitor C24, and is connected to the second current receiving terminal 36 of the control chip U6, and the other end of the third detection resistor R20 is connected to the sixth channel terminal 39 of the third switching element Q5.

In one embodiment, the third switching element Q5 may be a PNP type transistor, wherein the fifth channel terminal 38 of the third switching element Q5 is the emitter, the third control terminal 40 of the third switching element Q5 is the base, and the sixth channel terminal 39 of the third switching element Q5 is the collector. In other embodiments, the third switching element Q5 may also be other types of transistors (such as PMOS transistors), etc.

In the following description, the third switching element Q5 is a PNP transistor as an example. Specifically, when neither the first control signal input terminal 20 nor the second control signal input terminal 21 receives an effective level and an atomizer (or a heating wire) is installed in the electronic cigarette, the first enable signal output terminal 29 of the control chip U6 outputs a low-level signal, so that the third switching element Q5 is turned on, the first current receiving terminal 35 and the second current receiving terminal 36 of the control chip U6 respectively receive the current flowing through the second detection resistor R21 and the current flowing through the third detection resistor R20, and the resistance value of the heating wire is obtained according to the current difference received by the first current receiving terminal 35 and the second current receiving terminal 36.

The voltage output circuit 100 of this embodiment includes a resistance detection circuit 110, so that the resistance value of the heating wire can be obtained according to the current difference output by the resistance detection circuit 110. Therefore, the duty ratio of the output pulse width modulation signal can be adjusted according to the resistance value of the heating wire, thereby adjusting the voltage value of the driving voltage VOUT output to the heating wire, and the flexibility is further enhanced.

Figure 3:
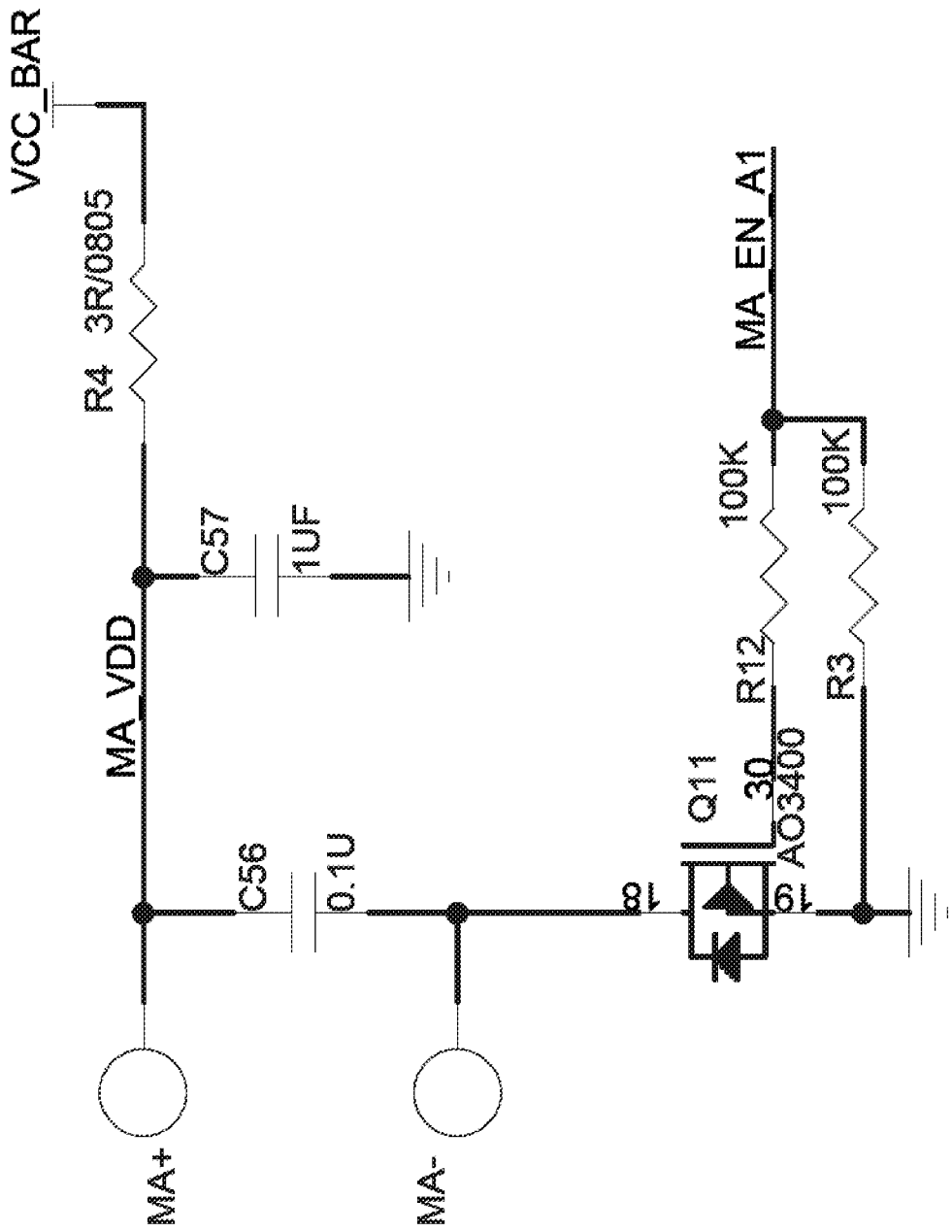
FIG. 3 is a schematic diagram of a motor connection provided by an embodiment of the present invention.

In an example of any of the foregoing embodiments, referring to FIGS. 1 to 3, FIG. 3 is a schematic diagram of a motor connection provided by an embodiment of the present invention. The first enable signal output terminal 29 of the control chip U6 is electrically connected to the second control terminal 30 of the second switching element Q11. The third channel terminal 19 of the second switching element Q11 is grounded. The fourth channel terminal 18 of the second switching element Q11 is electrically connected to the negative electrode MA− of the motor. The positive electrode MA+ of the motor receives the system power supply voltage VCC_BAT.

When the second control signal input terminal 21 receives an effective level, the second switching element Q11 controls the third channel terminal 19 and the fourth channel terminal 18 to be conducted according to the enable signal provided by the first enable signal output terminal 29 of the control chip U6, so that the motor is energized to work, to prompt the user that the touch on the touch panel is effective and to simulate the feel of a physical button.

Optionally, in the voltage output circuit 100 provided in any of the foregoing embodiments, the second control signal input terminal 21 of the control chip U6 may further be electrically connected to a button, so that the user can light up a cigarette to suck by operating the button or operating the touch panel.

Optionally, in the voltage output circuit 100 provided in any of the foregoing embodiments, the control chip U6 further includes at least one indicator control terminal, and each indicator control terminal is connected to an indicating circuit 200.

The indicating circuit 200 includes at least one eighth current limiting resistor R17 and at least one light-emitting diode D4. The cathode of each light-emitting diode D4 is connected to an indicator control terminal of the control chip U6 through an eighth current limiting resistor R17, and the anode of each light-emitting diode D4 receives the system power supply voltage VCC_BAT.

Figure 4:
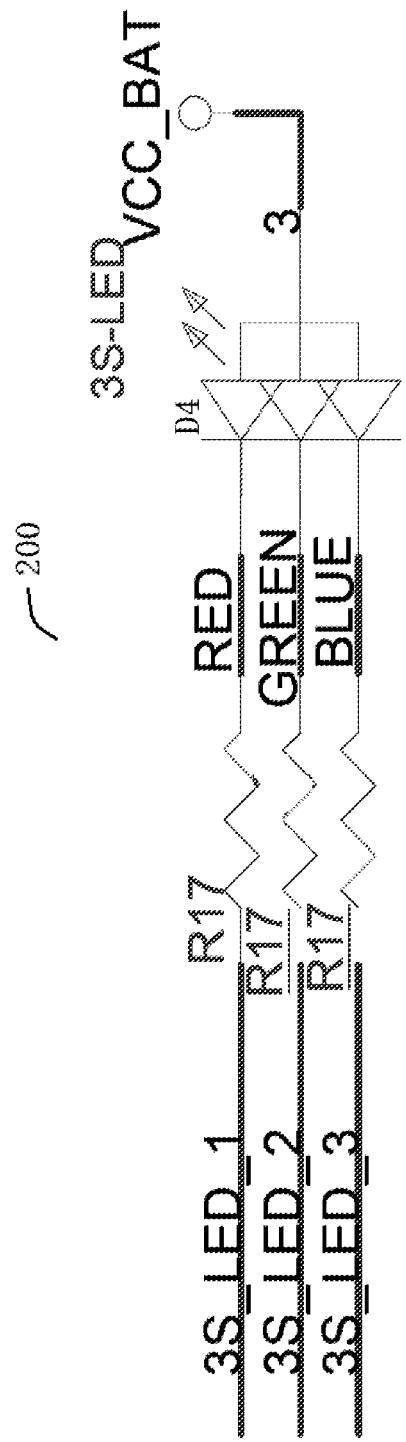
FIG. 4 is a schematic diagram of an indicating circuit provided by an embodiment of the present invention.

Referring to FIG. 1, FIG. 2 and FIG. 4, FIG. 4 is a schematic diagram of an indicating circuit 200 provided by an embodiment of the present invention. As an example, the control chip U6 includes three indicator control terminals (pin 5, pin 9 and pin 12 of the control chip U6) and the indicating circuit 200 includes three light-emitting diodes. Optionally, the light-emitting colors of the three light-emitting diodes can be red, blue, and green, respectively. Optionally, the three light-emitting diodes are arranged adjacently to form a light source group.

Optionally, when an effective level is inputted to the second control signal input terminal 21, the control chip U6 may control the light source group to display a first color, or control one of the light-emitting diodes to be lit up, to prompt the user that the touch on the touch panel is effective.

Optionally, when an effective level is inputted to the first control signal input terminal 20, the controller chip U6 may control the light source group to display a second color, or control one of the light-emitting diodes to be lit up, to prompt the user that the user is sucking.

Optionally, the control chip U6 may also control the lighting of the at least one light-emitting diode D4 through the indicator control terminal to prompt the quantity of electricity of the rechargeable battery or the output power of the electronic cigarette. For example, the quantity of electricity of the rechargeable battery is positively correlated with the brightness of the light-emitting diode D4, or the quantity of electricity of the rechargeable battery is positively correlated with the number of the light-emitting diodes D4 lit up in the indicating circuit. For another example, the output power of the electronic cigarette is positively correlated with the brightness of the light-emitting diode D4, or the output power of the electronic cigarette is positively correlated with the number of the light-emitting diodes D4 lit up in the indicating circuit.

Optionally, when an effective level is received by either of the first control signal input terminal 20 and the second control signal input terminal 21, the control chip U6 may control the light source group to display a third color, or control one of the light-emitting diodes to be lit up, to prompt the user that the atomizer in the electronic cigarette is atomizing.

Optionally, the control chip U6 may also control the display color of the at least one light-emitting diode D4 to indicate the quantity of electricity of the battery, the output power, the sucking time, the sucking strength, etc. of the electronic cigarette. The display color is set by the R&D staff at the factory or by the user.

In addition, the control chip U6 may also combine the three parameters of the number of the light-emitting diodes being lit up, the brightness and the color to indicate the quantity of electricity of the battery, the output power, the sucking time, the sucking strength, etc. of the electronic cigarette. This is not limited in this embodiment.

Figure 5:
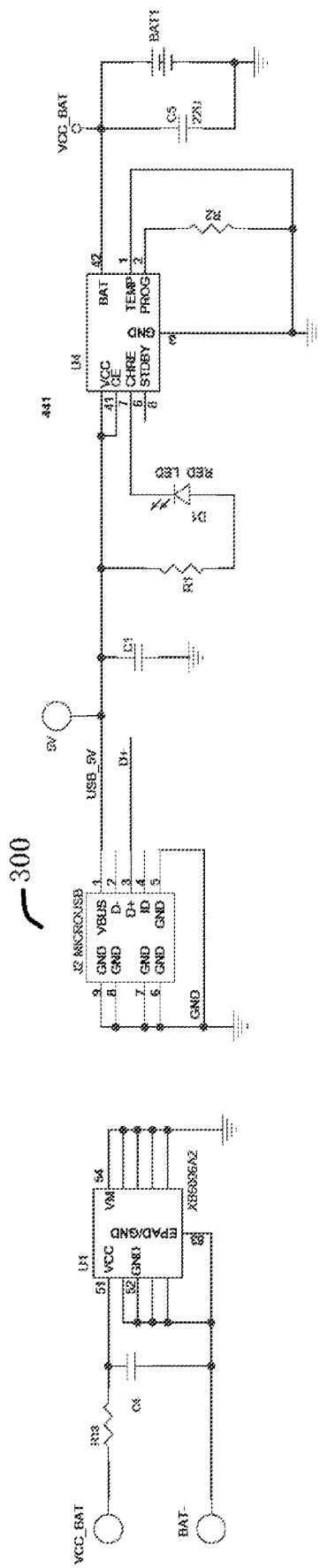
FIG. 5 is a schematic diagram of a charging circuit provided by an embodiment of the present invention.

In an example of any of the above embodiments, the electronic cigarette further includes a charging circuit 300. As shown in FIG. 5, the charging circuit 300 includes a connector J2 and a charging chip U4.

Specifically, the charging chip U4 includes a second power receiving terminal 41 and a charging voltage output terminal 42. The second power receiving terminal 41 is connected to an external power source through the connector J2, and the charging voltage output terminal 42 is used to output the charging voltage to the positive electrode BAT+ of the rechargeable battery.

In one embodiment, the second power receiving terminal 41 and the charging voltage output terminal 42 are the VCC pin and the OUT pin of the charging chip U4, respectively.

In one embodiment, the charging circuit 300 further includes a battery protection chip U1, and the battery protection chip U1 includes a third power receiving terminal 51, a ground terminal 52, a heat sink terminal 53, and a charging detection terminal 54.

Specifically, the third power receiving terminal 51 of the battery protection chip U1 is connected to the positive electrode BAT+ of the rechargeable battery, the ground terminal 52 of the battery protection chip U1 is connected to the negative electrode BAT- of the rechargeable battery, the heat sink terminal 53 of the battery protection chip U1 is connected to the ground terminal 52 of the battery protection chip U1, and the charging detection terminal 54 of the battery protection chip U is grounded. The heat sink of the battery protection chip U1 is used to reduce the temperature of the battery protection chip U1 to avoid high temperature burnout. The heat sink terminal 53 of the battery protection chip U1 is connected to the ground terminal 52 of the battery protection chip U1, which increases the grounding area of the battery protection chip U1, thereby increasing the over-current capability of the voltage output circuit 100.

Specifically, the battery protection chip U1 of this embodiment can be used to prevent overcharge or overdischarge of the rechargeable battery. The ground terminal 52 of the battery protection chip U1 is connected to the negative electrode BAT- of the rechargeable battery, and the charging detection terminal 54 of the battery protection chip U1 is grounded, so that the negative electrode BAT- of the rechargeable battery is not directly grounded. The battery protection chip U1 is set between the negative electrode BAT- of the rechargeable battery and the system ground, when the rechargeable battery needs to be charged or discharged, the negative electrode BAT- of the rechargeable battery needs to be connected to the ground through the conductive battery protection chip U1. Therefore, the battery protection chip U1 in the voltage output circuit 100 can determine whether the circuit state is in an overcharge or overdischarge state by detecting the current or voltage on its own pins or components, and then the connection between the negative electrode BAT- of the rechargeable battery and the system ground is disconnected when it is in the overcharge or overdischarge state, so that the rechargeable battery is protected.

In one embodiment, the third power receiving terminal 51 of the battery protection chip U1 is connected to the first terminal of a seventh filter capacitor C4, and the second terminal of the seventh filter capacitor C4 is connected to the negative electrode BAT- of the rechargeable battery. The seventh filter capacitor C4 can be used to filter the system power supply voltage VCC_BAT output by the positive electrode BAT+ of the rechargeable battery.

In one embodiment, the model of the battery protection chip U1 is XB6006A2. As shown in FIG. 5, the third power receiving terminal 51 of the battery protection chip U1 is the VCC terminal, the ground terminal 52 is the GND terminal, the heat sink terminal 53 is the EPAD/GND terminal, and the charging detection terminal 54 is the VM terminal.

The electronic cigarette of this embodiment can automatically disconnect the connection between the rechargeable battery and the charging chip U4 or the discharge circuit through the battery protection chip U1, to prevent the occurrence of overcharge or overdischarge of the rechargeable battery, thereby protecting the rechargeable battery and the electronic cigarette.

The voltage output circuit 100 and the electronic cigarette of the present invention use the control chip U6 to output a pulse width modulation signal to the buck switch chip U2, so that the buck switch chip U2 realizes voltage reduction according to the pulse width modulation signal, and outputs a driving voltage VOUT whose voltage value is less than the system supply voltage VCC_BAT to a load such as a heating wire. The flexibility is good, and the driving voltage VOUT can be output by using only the control chip U6 and the buck switch chip U2, the structure is simple.

In addition, in the embodiments of the present invention, the electronic cigarette may include a rechargeable battery or a non-rechargeable battery, which is not limited in this embodiment. The types of the battery in the electronic cigarette can be rechargeable or non-rechargeable batteries such as lithium batteries, alkaline dry batteries, nickel-metal hydride batteries, lead-acid batteries, iron-nickel batteries, metal oxide batteries, zinc-silver batteries, zinc-nickel batteries, hydrogen-oxygen fuel cells, solar cells, etc. that can provide electrical energy.

The embodiments described above are merely preferred embodiments, but not intended to limit the application. Any modifications, alternatives or improvements made within the principle and spirit of the present application should be interpreted as falling within the protection scope of the present application. The claims are not limited to the features or acts described above. Rather, the proper scope of the disclosure is defined by the appended claims.

What is claimed is:

1. A voltage output circuit, wherein the voltage output circuit comprises:
    a control chip (U6), the control chip (U6) comprises a first control signal input terminal (20), a second control signal input terminal (21), and a modulation signal output terminal (23), the first control signal input terminal (20) is connected to a first control signal output terminal (24) of a suction detection element (J3), the second control signal input terminal (21) is connected to a second control signal output terminal (37) of a touch sensing chip (U8), a touch input pin (25) of the touch sensing chip (U8) is connected to a touch panel;
    a buck switch chip (U2), the buck switch chip (U2) comprises a first channel terminal (26), a first control terminal (27), and a second channel terminal (28), the first channel terminal (26) of the buck switch chip (U2) receives a system power supply voltage, the first control terminal (27) of the buck switch chip (U2) is connected to the modulation signal output terminal (23) of the control chip (U6);
    when the first control signal input terminal (20) receives an effective level and/or the second control signal input terminal (21) receives an effective level, the modulation signal output terminal (23) of the control chip (U6) outputs a pulse width modulation signal to the first control terminal (27) of the buck switch chip (U2);
    when the first control terminal (27) of the buck switch chip (U2) receives a pulse width modulation signal of an effective level, the first channel terminal (26) and the second channel terminal (28) are controlled to be conducted, and the second channel terminal (28) outputs a driving voltage with a voltage value thereof being less than a voltage value of the system power supply voltage.

2. The voltage output circuit according to claim 1, wherein a first enable signal output terminal (29) of the control chip (U6) is electrically connected to a second control terminal (30) of a second switching element (Q11), a third channel terminal (19) of the second switching element (Q11) is grounded, a fourth channel terminal (18) of the second switching element (Q11) is electrically connected to a negative electrode of a motor, and a positive electrode of the motor receives the system power supply voltage;
    when the second control signal input terminal (21) receives an effective level, the second switching element (Q11) controls the third channel terminal (19) and the fourth channel terminal (18) to be conducted according to an enable signal provided by the first enable signal output terminal (29) of the control chip (U6), so that the motor is energized to work.

3. The voltage output circuit according to claim 1, wherein the first control signal input terminal (20) of the control chip (U6) is electrically connected to the first control signal output terminal (24) of the suction detection element (J3) through a first current limiting resistor (R5); and/or,
    the second control signal input terminal (21) of the control chip (U6) is connected to the second control signal output terminal (37) of the touch sensing chip (U8) through a second current limiting resistor (R11); and/or,
    the first channel terminal (26) of the buck switch chip (U2) is connected to the modulation signal output terminal (23) of the control chip (U6) through a third current limiting resistor (R10); and/or,
    the first control signal output terminal (24) of the suction detection element (J3) is grounded through a fourth current limiting resistor (R8).

4. The voltage output circuit according to claim 1, wherein a first power receiving terminal (32) of the control chip (U6) is grounded through a first filter capacitor (C2) and receives the system power supply voltage through a fifth current limiting resistor (R14); and/or,
    the first channel terminal (26) of the buck switch chip (U2) is further grounded through a second filter capacitor (C3); and/or,
    the touch input pin (25) of the touch sensing chip (U8) is further grounded through a third filter capacitor (C6); and/or,
    a second power input terminal (33) of the touch sensing chip (U8) receives the system power supply voltage and is grounded through a fourth filter capacitor (C7).

5. The voltage output circuit according to claim 1, wherein the second channel terminal (28) of the buck switch chip (U2) is connected to a heating wire to output the driving voltage to drive the heating wire to generate heat.

6. The voltage output circuit according to claim 1, wherein the control chip (U6) further comprises a second enable signal output terminal (34), a first current receiving terminal (35), and a second current receiving terminal (36), the voltage output circuit further comprises a resistance detection circuit (110), the second enable signal output terminal (34) of the control chip (U6) is connected to the resistance detection circuit (110);
    the resistance detection circuit (110) comprises a sixth current limiting resistor (R23), a seventh current limiting resistor (R22), a first detection resistor (R18), a second detection resistor (R21), a third detection resistor (R20), a fifth filter capacitor (C25), a sixth filter capacitor (C24), and a third switching element (Q5);

a fifth channel terminal (38) of the third switching element (Q5) receives the system power supply voltage and is connected to the second enable signal output terminal (34) of the control chip (U6) through the sixth current limiting resistor (R23); a third control terminal (40) of the third switching element (Q5) is connected to the second enable signal output terminal (34) of the control chip (U6) through the seventh current limiting resistor (R22); a sixth channel terminal (39) of the third switching element (Q5) is connected to the second channel terminal (28) of the buck switch chip (U2) through the first detection resistor (R18);

one end of the second detection resistor (R21) is grounded through the fifth filter capacitor (C25) and is connected to the first current receiving terminal (35) of the control chip (U6), the other end of the second detection resistor (R21) is connected to the second channel terminal (28) of the buck switch chip (U2);

one end of the third detection resistor (R20) is grounded through the sixth filter capacitor (C24) and is connected to the second current receiving terminal (36) of the control chip (U6), the other end of the third detection resistor (R20) is connected to the sixth channel terminal (39) of the third switching element (Q5).

7. The voltage output circuit according to claim 1, wherein the control chip (U6) further comprises at least one indicator control terminal, and each indicator control terminal is connected to an indicating circuit (200);

the indicating circuit (200) comprises at least one eighth current limiting resistor (R17) and at least one light-emitting diode (D4), the cathode of each light-emitting diode (D4) is connected to an indicator control terminal of the control chip (U6) through an eighth current limiting resistor (R17), the anode of each light-emitting diode (D4) receives the system power supply voltage.

8. The voltage output circuit according to claim 1, wherein the voltage output circuit further comprises the touch sensing chip (U8) and/or the suction detection element (J3).

9. An electronic cigarette comprising the voltage output circuit according to claim 1.

10. The electronic cigarette according to claim 9, wherein the electronic cigarette further comprises a rechargeable battery, the rechargeable battery is used to provide the system power supply voltage.

11. The electronic cigarette according to claim 9, wherein the electronic cigarette further comprises a charging circuit (300), the charging circuit (300) comprises a connector (J2) and a charging chip (U4);

the charging chip (U4) comprises a second power receiving terminal (41) and a charging voltage output terminal (42), the second power receiving terminal (41) is connected to an external power source through the connector (J2), the charging voltage output terminal (42) is used to output a charging voltage to the positive electrode of the rechargeable battery.

12. The electronic cigarette according to claim 11, wherein the charging circuit (300) further comprises a battery protection chip (U1), the battery protection chip (U1) comprises a third power receiving terminal (51), a ground terminal (52), a heat sink terminal (53), and a charging detection terminal (54);

the third power receiving terminal (51) of the battery protection chip (U1) is connected to the positive electrode of the rechargeable battery, the ground terminal (52) of the battery protection chip (U1) is connected to the negative electrode of the rechargeable battery, the heat sink terminal (53) of the battery protection chip (U1) is connected to the ground terminal (52) of the battery protection chip (U1), the charging detection terminal (54) of the battery protection chip (U1) is grounded.

\* \* \* \* \*